United States Patent [19]
Frey et al.

[11] Patent Number: 5,908,871
[45] Date of Patent: Jun. 1, 1999

[54] POLYESTER POLYURETHANE FLEXIBLE SLABSTOCK FOAM MADE USING REDUCED EMISSION SURFACTANT

[75] Inventors: John Herbert Frey, Alburtis, Pa.; David Robert Battice, Prudenville, Mich.; Krunoslav Muha, Ulzburg, Germany; Lenin James Petroff, Bay City, Mich.

[73] Assignee: Air Products and Chemicals, Inc., Allentown, Pa.

[21] Appl. No.: 09/126,239

[22] Filed: Jul. 30, 1998

Related U.S. Application Data

[63] Continuation of application No. 09/007,594, Jan. 15, 1998.
[51] Int. Cl.$^6$ .............................. C08G 18/00; C08G 18/34
[52] U.S. Cl. .......................... 521/112; 521/172; 528/26; 556/445
[58] Field of Search ..................................... 521/112, 172; 528/26; 556/445

[56] References Cited

U.S. PATENT DOCUMENTS

| | | | |
|---|---|---|---|
| 3,560,544 | 2/1971 | Haluska et al. | 260/448.2 |
| 4,331,555 | 5/1982 | Baskent et al. | 252/351 |
| 4,751,251 | 6/1988 | Thornsberry | 521/112 |
| 5,296,625 | 3/1994 | O'Lenick, Jr. | 556/437 |

OTHER PUBLICATIONS

Silman, Eddie, et al. "Recent Developments in Stabilizers for Flexible Polyester Polyurethane Foam", (Spring Technical Conference of the PFA, May 17, 1996) p. 3.

Baatz, G. and Dr. H. W. Illger, Dr. H. Rabe, "Slabstock Foams" polyurethane Handbook, Güter Oertel, $2^{nd}$ ed. Hanser Publishers 1994.

*Primary Examiner*—Morton Foelak
*Attorney, Agent, or Firm*—Michael Leach

[57] ABSTRACT

A method for preparing a polyester polyurethane flexible slabstock foam by reacting an organic polyisocyanate with a polyester polyol in the presence of urethane catalyst, water as a blowing agent and a silicone surfactant characterized in that the silicone surfactant comprises the reaction product of 1,1,1,3,5,5,5-hepta(hydrocarbyl)trisiloxane coupled with polyalkyleneoxide mono allyl ether and capped with a succinic anhydride.

20 Claims, No Drawings

POLYESTER POLYURETHANE FLEXIBLE SLABSTOCK FOAM MADE USING REDUCED EMISSION SURFACTANT

This application is a continuation of application Ser. No. 09/007,594 filed Jan. 15, 1998.

FIELD OF THE INVENTION

The invention relates to making polyurethane flexible slabstock foam using silicone surfactants a cell stabilizers.

BACKGROUND OF THE INVENTION

Polyester polyrethane foam requires surfactant stabilizers to manufacture foam with good cell structure and an open cell structure to prevent shrinkage but enough stability to prevent form collapse. The surfactants also act as emulsifiers. More and more, the industry is driving to reduced emissions for additives including reduced emissions of silicone surfactants. It is also desirable to move toward higher levels of water in the polyester formulations, but high levels of water make processing difficult often resulting in poor quality foam.

Several companies offer surfactants for polyester polyurethane foam manufacture including Byk Chemie GmbH, Th. Goldschmidt AG and Witco (Europe) SA. As stated in E. Silma et al, "Recent Developments in Stabilizers for Flexible Polyester Polyurethane Foam" (Spring Technical Conference of the PFA, May 17, 1996), p 3, "Silicone surfactants For flexible polyester polyurethane foam are organomodified polydimethylsiloxanes". This paper also describes a new low fogging silicone surfactant named B8324. Surfactants for polyester polyurethane foam can also be organic in nature and not contain any silicone.

U.S. Pat. No. 4,331,555 discloses a method for making low density flexible polyester polyurethane foam using as a foam stabilizer certain low molecular weight organosiloxane compositions. This patent explicitly covers polydimethylsiloxanes since the backbones contain (Me2SiO)x groups where x is at least one.

U.S. Pat. No. 3,560,544 discloses triorganosiloxy endblocked polyoxyalkylene siloxane polymers with suggested utility as surfactants, wetting agents, detergents, emulsifying agents, fiber lubricants and foam stabilizers for urethane foams.

U.S. Pat. No. 4,751,251 discloses a surfactant composition for rigid urethane foams comprising an organic surfactant. A siloxane-polyoxyalkylene surfactant and water or an alcohol, or both. An organomodified polydimethylsiloxane copolymer which has been capped with dodecyl succinic anhydride is suggested for use in rigid polyurethane foam.

U.S. Pat. No. 5,296,625 discloses silicone alkoxylated esters which contain terminal carboxyl groups as solubilizers.

SUMMARY OF THE INVENTION

The invention is a method for preparing water-blown, polyester polyurethane flexible slabstock foam using a class of silicone surfactants which do not have a polydimethylsiloxane character. The method comprises reacting an organic polyisocyanate and a polyester polyol in the presence of a catalyst composition, water as a blowing agent and as the silicone surfactant a composition which is the reaction product of 1,1,1,3,5,5,5-hepta(hydrocarbyl)trisiloxane coupled with a polyalkyleneoxide mono allyl ether and capped with a succinic anhydride.

These silicone surfactants are low fogging cell stabilizers. In addition to stabilization, these materials afford a fine celled foam with high airflow and minimum shrinkage. Also, in foam compositions containing high water levels they unexpectedly provide foams without causing splits or foam collapse compared to other competitive surfactants.

DETAILED DESCRIPTION OF THE INVENTION

The silicone surfactants used in the preparation of the flexible slabstock foams are the reaction product of a hepta (hydrocarbyl)trisiloxane, preferably 1,1,1,3,5,5,5-heptamethyltrisiloxane, of the formula

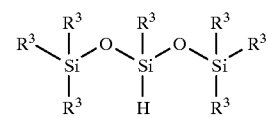

where $R^3$ is a C1–C20 monovalent hydrocarbyl group, coupled with a polyalkylene oxide mono allyl ether and capped with a succinic anhydride. Monovalent hydrocarbyl groups suitable as $R^3$ are exemplified by alkyl groups such as methyl, ethyl, propyl, butyl, hexyl, octyl, decyl, dodecyl and octadecyl, cycloaliphatic groups such as cyclohexyl, aryl groups such as phenyl, tolyl, and xylyl, and aralkyl groups such as benzyl and phenylethyl. It is preferred that $R^3$ is methyl or phenyl. The several $R^3$ groups can be identical or different, as desired, and preferably at least 50% of all $R^3$ groups are methyl.

The polyalkylene oxide moiety may comprise ethylene oxide, propylene oxide, butylene oxide or a blend thereof, but preferably is polyethylene oxide $(EO)_x$. The number of polymerized alkylene oxide units may range from 2 to 30, preferably 5 to 15.

Suitable succinic anhydride materials include succinic anhydride and a hydrocarbyl group-containing succinic anhydride, such as an alkyl or alkenyl group. The hydrocarbyl group of the succinic anhydride may contain 1 to 20, preferably 6 to 16 carbon atoms, such as for example n-hexenyl and dodecenyl (also called tetrapropenyl). The preferred reaction product is 1,1,1,3,5,5,5-heptamethyltrisiloxane coupled with dodecaethyleneoxide $(EO)_{12}$ mono allyl ether and capped with dodecenyl (C12) succinic anhydride (DDSA).

Suitable silicone surfactant reaction products should comprise at least 90 wt %, preferably 95 wt %, of silicone compounds (total silicone species basis) represented by the following generic structure:

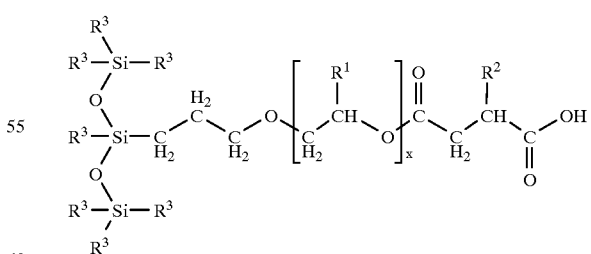

where $R^1$ is hydrogen or a C1–C2 alkyl group, $R^2$ is hydrogen or a C1–C20 hydrocarbyl group, $R^3$ is a C1–C20 monovalent hydrocarbyl group and x is an integer ranging from 2 to 30.

These silicone surfactant products can be prepared according to the methods well known in the art, for example as taught in U.S. Pat. No. 3,560,544, which is incorporated by reference, and can be used in combination with other silicone surfactants well known as cell stabilizers for making polyester polyurethane foams. When used in such combination, the silicone surfactant reaction products according to the invention should compose at least 50 wt % of the total silicone surfactant composition, preferably at least 80 wt %.

The surfactants according to the invention are employed in the manufacture of polyester flexible polyurethane foam in the manner known to the art. In producing the polyurethane foams using these surfactants, one or more polyester polyols are employed for reaction with a polyisocyanate to provide the urethane linkage. Such polyols have an average of typically 2.0 to 3.5 hydroxyl groups per molecule.

Suitable polyester polyols as a component of the polyurethane composition for flexible slabstock foams are well known in the industry. Illustrative of such suitable polyester polyols for flexible slabstock foams are those produced by reacting a dicarboxylic and/or monocarboxylic acid with an excess of a diol and/or polyhydroxy alcohol, for example, adipic acid, glutaric acid, succinic acid, phthalic acid or anhydride, and/or fatty acids (linolic acid, oleic acid and the like) with diethylene glycol, ethylene glycol, propylene glycol, dipropylene glycol, 1,4-butanediol, neopentyl glycol, trimethylolpropane, trimethyloethane, and/or pentaerythritol. Other suitable polyester polyols can be prepared by reacting a lactone with an excess of a diol such as caprolactone with propylene glycol. See U.S. Pat. No. 4,331,555 for further discussion of suitable polyester polyols.

In the practice of this invention, a single high molecular weight polyester polyol may be used. Also, mixtures of high molecular weight polyester polyols such as mixtures of di- and trifunctional materials and/or different molecular weight or different chemical composition materials may be used.

The polyurethane products are prepared using any suitable organic polyisocyanates well known in the art including, for example, hexamethylene diisocyanate, phenylene diisocyanate, toluene diisocyanate (TDI) and 4,4'-diphenylmethane diisocyanate (MDI). Especially suitable are the 2,4- and 2,6-TDI's individually or together as their commercially available mixtures. Other suitable isocyanates are mixtures of diisocyanates known commercially as "crude MDI", also known as PAPI, which contain about 60% of 4,4'-diphenylmethane diisocyanate along with other isomeric and analogous higher polyisocyanates. Also suitable are "prepolymers" of these polyisocyanates comprising a partially prereacted mixture of a polyisocyanates and a polyether or polyester polyol.

Suitable urethane catalysts useful in the present invention are all those well known to the worker skilled in the art including tertiary amines such as triethylenediamine, N-methylimidazole, 1,2-dimethylimidazole, N-methylmorpholine, N-ethylmorpholine, triethylamine, tributylamine, triethanolamine, dimethylethanolamine and bisdimethylaminodiethylether, and organotins such as stannous octoate, stannous acetate, stannous oleate, stannous laurate, dibutyltin dilaurate, and other such tin salts.

Other typical agents which may be found in the flexible polyurethane foam formulations include chain extenders such as ethylene glycol and butanediol; crosslinkers such as diethanolamine, diisopropanolamine, triethanolamine and tripropanolamine; antioxidants, UV stabilizers and especially blowing agents such as water, liquid carbon dioxide, acetone, pentane, HFCs, HCFCs, CFCs, methylene chloride and the like. In the present invention the preferred blowing agent for making the flexible slabstock foams is water at 1 to 8 parts per hundred polyol (pphp), especially 3 to 6 pphp, optionally with other blowing agents.

Other additives may of course be employed to impart specific properties to the foam. Examples are materials such as flame retardants, colorants, fillers and hardness modifiers.

The polyurethane foams of this invention may be formed in accordance with any of the processing techniques known to the art, such as, in particular, the "one shot" technique. In accordance with this method, foamed products are provided by carrying out the reaction of the polyisocyanate and polyol simultaneously with the foaming operation. It is sometimes convenient to add the surfactant to the reaction mixture as a premixture with one or more of the blowing agent, polyol, water, and catalyst components.

It is to be understood that the relative amounts of the various components of the foam formulation are not narrowly critical. The polyol and polyisocyanate are present in the foam-producing formulation in the major amount. The relative amounts of these two components in the mixture are well known to the art. The blowing agent, catalysts, and surfactant are each present in a minor amount sufficient to foam the reaction mixture. The catalysts are present in a catalytic amount, i.e., that amount necessary to catalyze the reactions to produce the urethane and urea at a reasonable rate, and the surfactant is present in the amount sufficient to impart the properties desired and to stabilize the reacting foam, for example, 0.3 to 3 pphp.

In a typical flexible slabstock foam preparation, the TDI, polyol, water, surfactant, urethane catalysts, and optional blowing agent are blended together in a continuous mixhead and the reaction composition is deposited on a continuous conveyor and allowed to foam and polymerize.

The flexible polyurethane foams produced in accordance with the present invention can be used in the same area as conventional polyurethane foams. For example, the foams of the present invention can be used with advantage in the manufacture of textile interliners, cushions, mattresses, padding, carpet underlay, packaging, gaskets, sealers, thermal insulators and the like.

A general polyester polyurethane flexible slabstock foam formulation containing the silicone surfactants according to the invention would comprise the following components in parts by weight (pbw):

| Polyester Flexible Slabstock Foam Formulation | (pbw) |
| --- | --- |
| Polyol | 100 |
| Silicone Surfactant | 0.3–3 |
| Water | 1–8 |
| Auxiliary Blowing Agent | 0–20 |
| Urethane Catalyst | 0.3–3 |
| Isocyanate Index (preferably TDI) | 85–120 |

In a preferred flexible slabstock foam formulation the water level is 3–6 pphp and the isocyanate is TDI at an index in the range of about 90 to 110.

EXAMPLE 1

1,1,1,3,5,5,5-Heptamethyltrisiloxane coupled with dodecaethyleneoxide $(EO)_{12}$ mono allyl ether and capped with dodecenyl (C12) succinic anhydride (DDSA) was prepared by mixing a silicone surfactant [64.5 wt %; 1,1,1,3,5,5,5-heptamethyltrisiloxane coupled with dodecaethyleneoxide (EO12) mono allyl ether] and dodecenyl succinic anhydride [35.5 wt %; Humphry Chemical] under nitrogen for two hr at 120° C. After two hr the capping reaction was complete. The final product which comprised 99.1 wt % (based on total silicone species) of the following structure INV. In the following examples the product was dissolved 50/50 in Texanol solvent (2,2,4-trimethyl-1,3-pentanediol mono isobutyrate) and identified as Surfactant INV.

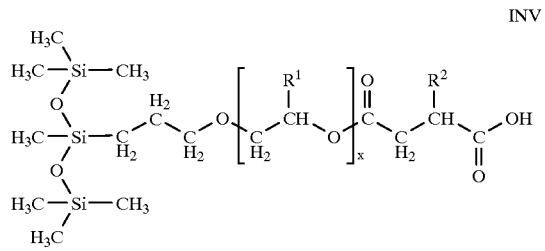

where $R^1$ is hydrogen, $R^2$ is dodecenyl and x is 12.

EXAMPLES 2–4

Silicone Surfactant INV was compared to several competitive surfactants in three different polyurethane formulations comprising water at 3, 5 and 5.4 pphp, respectively, as shown in Tables 1–3 below. In the Tables the following materials were used:

Desmophen 2200 polyester polyol from Bayer AG (OH#= 60)

Desmophen 2450 polyester polyol from Bayer AG (OH#= 213)

DABCO® NEM catalyst from Air Products and Chemicals, Inc. (APCI)

DABCO 2039 catalyst from APCI

Catalyst A—proprietary catalyst from APCI

Silicone Surfactant PA—organomodified polydimethylsiloxane surfactant of APCI

Silicone Surfactant INV according to invention

Niax SE 232 surfactant from Witco (Europe) SA

BYK LPX 883 surfactant from Byk Chemie GmbH

Tegostab B-8300 silicone surfactant from Th. Goldschmidt AG

Tegostab B-8312 silicone surfactant from Th. Goldschmidt AG

Desmophen T-80 TDI from Bayer AG

Desmophen T-65 TDI from Bayer AG

Silicone Surfactant PA is a prior art organomodified polydimethylsiloxane and comprises 44 wt % (total silicone species basis) of the silicone of structure INV above. Because of the lower molecular weight end of the polydimethylsiloxane distribution, Silicone Surfactant PA will produce emissions at elevated temperatures. Headspace chromatograms, which depict the composition of the headspace of the PA and INV surfactant liquids at 130° C., show that much lower levels and fewer species of volatile silicone components are released with the preferred Surfactant INV, thus affording a reduced emission surfactant.

Polyol(s), water, catalyst(s) and silicone surfactant were preweighed into a 0.8 liter plastic cup. This polyol composition was mixed for 15 seconds at 4500 rpm with a high shear mixer using a round 4.5 cm diameter mixing blade. TDI isocyanate (T80, T65 or mixtures of T80 and T65 in different ratios) was immediately added to polyol composition using a dispenser and mixed for 7 seconds at 4500 rpm using the same mixer. The desired matrix weight was poured into a paper cup (2.0 liter) where the foam reaction took place. The foam height was measured with an ultrasonic measuring device, also called rate of rise. After the measurement, the polyester foam was transferred into a 70° C. preheated oven and cured for 24 hr after which the foam height was measured again with the rate of rise equipment and tested for physical properties, such as cup density, cell structures (visual) and shrinkage (visual).

It can be seen from the data in the tables that at water levels higher than about 5 pphp, comparative surfactants resulted in splits and coarse cells whereas Surfactant INV resulted in a good foam with fine cell structure and minimum shrinkage.

TABLE 1

| Run No. | 1 | 2 | 3 | 4 | 5 | 6 |
|---|---|---|---|---|---|---|
| Desmophen 2200 | 100.0 | 100.0 | 100.0 | 100.0 | 100.0 | 100.0 |
| Desmophen 2450 | x | x | x | x | x | x |
| Water | 3.0 | 3.0 | 3.0 | 3.0 | 3.0 | 3.0 |
| Dabco NEM | 1.5 | 1.5 | 1.5 | 1.5 | 1.5 | 1.5 |
| Dabco 2039 | x | x | x | x | x | x |
| Catalyst A | x | x | x | x | x | x |
| Surfactant PA | 1.0 | x | x | x | x | x |
| Surfactant INV | x | 1.0 | x | x | x | x |
| Niax SE 232 | x | x | 1.0 | x | x | x |
| BYK LPX 883 | x | x | x | 1.0 | x | x |
| Tegostab B-8300 | x | x | x | x | 1.0 | x |
| Tegostab B-8312 | x | x | x | x | x | 1.0 |
| Desmophen T-80 | 36.6 | 36.6 | 36.6 | 36.6 | 36.6 | 36.6 |
| Desmophen T-65 | x | x | x | x | x | x |
| Index | 95 | 95 | 95 | 95 | 95 | 95 |
| Start time (sec) | 17 | 16 | 17 | 17 | 17 | 17 |
| Rise time (sec) | 96 | 92 | 99 | 91 | 92 | 92 |
| Max. height (mm) | 190.5 | 186.6 | 185.4 | 191.5 | 194.4 | 192.8 |
| Height 5 min. (mm) | 189.0 | 184.4 | 184.1 | 187.5 | 188.4 | 188.2 |
| Rec. 5 min. (%) | 0.8 | 1.2 | 0.7 | 2.1 | 3.1 | 2.4 |
| Rec. height 24 h (mm) | 179.0 | 176.5 | 177.9 | 181.3 | 182.1 | 182.2 |
| Rec. 24 h (%) | 6.0 | 5.4 | 4.0 | 5.3 | 6.3 | 5.5 |
| Shrinkage[a] | 3 | 2 | 5 | 1 | 2 | 2 |
| Cell structure[b] | 2 | 2 | 2 | 1 | 2 | 3 |
| Cup density (kg/m3) | 42.6 | 43.7 | 42.6 | 42.6 | 43.0 | 42.8 |

[a] 0 = no shrinkage; 5 = high degree of shrinkage
[b] 1 = fine; 5 = coarse

TABLE 2

| Run No. | 7 | 8 | 9 | 10 | 11 | 12 |
|---|---|---|---|---|---|---|
| Desmophen 2200 | 100.0 | 100.0 | 100.0 | 100.0 | 100.0 | 100.0 |
| Desmophen 2450 | x | x | x | x | x | x |
| Water | 5.0 | 5.0 | 5.0 | 5.0 | 5.0 | 5.0 |
| Dabco NEM | 1.5 | 1.5 | 1.5 | 1.5 | 1.5 | 1.5 |
| Dabco 2039 | x | x | x | x | x | x |
| Catalyst A | x | x | x | x | x | x |
| Surfactant PA | 1.5 | x | x | x | x | x |
| Surfactant INV | x | 1.5 | x | x | x | x |
| Niax SE 232 | | | 1.5 | x | x | x |
| BYK LPX 883 | | | x | 1.5 | x | x |
| Tegostab B-8300 | | | x | x | 1.5 | x |
| Tegostab B-8312 | | | x | x | x | 1.5 |

TABLE 2-continued

| Run No. | 7 | 8 | 9 | 10 | 11 | 12 |
|---|---|---|---|---|---|---|
| Desmophen T-80 | 55.07 | 55.07 | 55.07 | 55.07 | 55.07 | 55.07 |
| Desmophen T-65 | x | x | x | x | x | x |
| Index | 95 | 95 | 95 | 95 | 95 | 95 |
| Start time (sec) | 18 | 18 | 19 | 18 | 18 | 18 |
| Rise time (sec) | 76 | 76 | 83 | 79 | 76 | 78 |
| Max. height (mm) | 207.5 | 202.8 | 212.3 | 199.6 | 211.1 | 208.4 |
| Height 5 min. (mm) | 204.1 | 194.9 | 209.6 | 173.7 | 205.5 | 179.2 |
| Rec. 5 min. (%) | 1.6 | 3.9 | 1.3 | 13 | 2.7 | 14 |
| Rec. height 24 h (mm) | 197.5 | 188.6 | 197.2 | 168.0 | 197.6 | 174.1 |
| Rec. 24 h (%) | 4.8 | 7.0 | 7.1 | 15.8 | 6.4 | 16.5 |
| Shrinkage[a] | 2 | 2 | 5 | split | 2 | split |
| Cell structure[b] | 3 | 3 | 5 | 2 | 3 | 3 |
| Cup density (kg/m3) | 28.6 | 30.0 | 28.1 | 33.1 | 28.8 | 30.2 |

[a] 0 = no shrinkage; 5 = high degree of shrinkage
[b] 1 = fine; 5 = coarse

TABLE 3

| Run No. | 13 | 14 | 15 | 16 | 17 | 18 |
|---|---|---|---|---|---|---|
| Desmophen 2200 | 85.0 | 85.0 | 85.0 | 85.0 | 85.0 | 85.0 |
| Desmophen 2450 | 15.0 | 15.0 | 15.0 | 15.0 | 15.0 | 15.0 |
| Water | 5.4 | 5.4 | 5.4 | 5.4 | 5.4 | 5.4 |
| Dabco NEM | x | x | x | x | x | x |
| Dabco 2039 | 0.4 | 0.4 | 0.4 | 0.4 | 0.4 | 0.4 |
| Catalyst A | 0.4 | 0.4 | 0.4 | 0.4 | 0.4 | 0.4 |
| Surfactant PA | 1.5 | x | x | x | x | x |
| Surfactant INV | x | 1.5 | x | x | x | x |
| Niax SE 232 | x | x | 1.5 | x | x | x |
| BYK LPX 883 | x | x | x | 1.5 | x | x |
| Tegostab B-8300 | x | x | x | x | 1.5 | x |
| Tegostab B-8312 | x | x | x | x | x | 1.5 |
| Desmophen T-80 | 33.72 | 33.72 | 33.72 | 33.72 | 33.72 | 33.72 |
| Desmophen T-65 | 33.72 | 33.72 | 33.72 | 33.72 | 33.72 | 33.72 |
| Index | 103 | 103 | 103 | 103 | 103 | 103 |
| Start time (sec) | 20 | 20 | 19 | 20 | 19 | 19 |
| Rise time (sec) | 80 | 77 | 74 | 75 | 74 | 75 |
| Max. height (mm) | 232.4 | 235.6 | 239.7 | 237.4 | 241.3 | 238.1 |
| Height 5 min. (mm) | 231.1 | 230.6 | 236.4 | 197.5 | 191.5 | 206.6 |
| Rec. 5 min. (%) | 0.6 | 2.1 | 1.4 | 16.8 | 20.6 | 13.2 |
| Rec. height 24 h (mm) | 221.1 | 225.1 | 223.2 | 192.4 | 185.4 | 199.3 |
| Rec. 24 h (%) | 4.9 | 4.5 | 6.9 | 19.0 | 23.2 | 16.3 |
| Shrinkage[a] | 3 | 2 | 4 | split | semi coll. | semi coll. |
| Cell structure[b] | 3 | 2 | 4 | 2 | 3 | 5 |
| Cup density (kg/m3) | 27.0 | 27.3 | 26.4 | 30.9 | 32.5 | 30.3 |

[a] 0 = no shrinkage; 5 = high degree of shrinkage
[b] 1 = fine; 5 = coarse

STATEMENT OF INDUSTRIAL APPLICATION

The invention affords a method for making water blown polyester polyurethane flexible foams without causing splits or foam collapse.

We claim:

1. In a method for preparing a polyester polyurethane flexible slabstock foam by reacting an organic polyisocyanate with a polyester polyol in the presence of urethane catalyst, water as a blowing agent and a silicone surfactant as a cell stabilizer, the improvement which comprises the silicone surfactant comprising the reaction product of a 1,1,1,3,5,5,5-hepta(hydrocarbyl)trisiloxane of the general structure

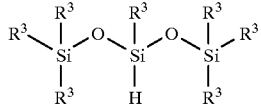

coupled with a polyalkyleneoxide mono allyl ether and capped with a succinic anhydride, the reaction product comprising at least 90 wt % of a silicone compound, based on total silicone species, which is represented by the general structure

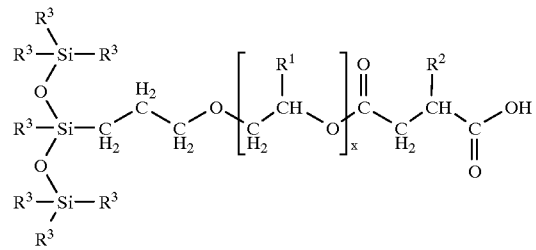

where $R^1$ is hydrogen or a C1–C2 alkyl group, $R^2$ is hydrogen or a C1–C20 hydrocarbyl group, $R^3$ is a C1–C20 hydrocarbyl group and x is an integer ranging from 2 to 30.

2. The method of claim 1 in which $R^3$ is methyl or phenyl.

3. The method of claim 1 in which the polyalkyleneoxide has 5 to 15 alkylene oxide units.

4. The method of claim 1 in which the succinic anhydride is a C6–C16 hydrocarbyl group-containing succinic anhydride.

5. The method of claim 3 in which the polyalkylene oxide is polyethylene oxide.

6. The method of claim 5 in which the succinic anhydride is n-hexenyl succinic anhydride or dodecenyl succinic anhydride.

7. The method of claim 1 in which $R^1$ is hydrogen, $R^2$ is a C6–C16 hydrocarbyl group, $R^3$ is methyl or phenyl and x is an integer ranging from 5 to 15.

8. In a method for preparing a polyester polyurethane flexible slabstock foam by reacting an organic polyisocyanate with a polyester polyol in the presence of urethane catalyst, water as a blowing agent and a silicone surfactant as a cell stabilizer, the improvement which comprises the silicone surfactant comprising the reaction product of 1,1,1,3,5,5,5-hepta(hydrocarbyl)trisiloxane coupled with a polyalkyleneoxide mono allyl ether and capped with a succinic anhydride, the reaction product comprising at least 95 wt % of a silicone compound, based on total silicone species, which is represented by the general structure

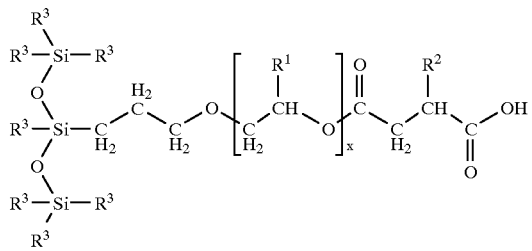

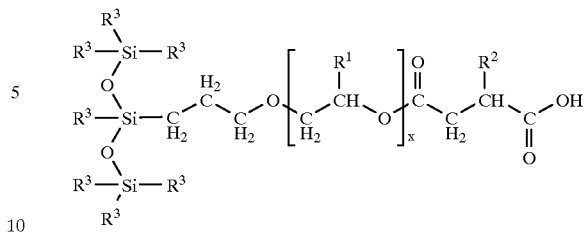

where $R^1$ is hydrogen or a C1–C2 alkyl group, $R^2$ is a C6–C16 hydrocarbyl group, $R^3$ is methyl or phenyl and x is an integer ranging from 5 to 15.

9. The method of claim 8 in which $R^1$ is hydrogen and $R^3$ is methyl.

10. The method of claim 9 in which the reaction product comprises about 99 wt % of a silicone compound, based on total silicone species, which is represented by the general structure where $R^2$ is dodecenyl and x is 12.

11. A polyester polyurethane foam composition comprising the following components in parts by weight (pbw):

|  | (pbw) |
| --- | --- |
| Polyester Polyol | 100 |
| Silicone Surfactant | 0.3–3 |
| Water | 1–8 |
| Auxiliary Blowing Agent | 0–20 |
| Urethane Catalyst | 0.3–3 |
| Isocyanate Index | 85–120 | in which the silicone surfactant comprises the reaction product of 1,1,1,3,5,5,5-hepta(hydrocarbyl)trisiloxane coupled with a polyalkyleneoxide mono allyl ether and capped with a succinic anhydride, the reaction product comprising at least 90 wt % of a silicone compound, based on total silicone species, which is represented by the general structure where $R^1$ is hydrogen or a C1–C2 alkyl group, $R^2$ is hydrogen or a C1–C20 hydrocarbyl group, $R^3$ is methyl or phenyl and x is an integer ranging from 2 to 30.

12. The polyester polyurethane foam composition of claim 11 in which $R^2$ is a C6–C16 hydrocarbyl group and x is an integer ranging from 5 to 15.

13. The polyester polyurethane foam composition of claim 12 in which the reaction product comprises about 95 wt % of a silicone compound, based on total silicone species, which is represented by the general structure where $R^1$ is hydrogen and $R^3$ is methyl.

14. The polyester polyurethane foam composition of claim 13 in which $R^2$ is dodecenyl and x is 12.

15. The method of claim 1 in which the water is present at greater than about 5 parts per hundred polyol.

16. The method of claim 2 in which the water is present at greater than about 5 parts per hundred polyol.

17. The method of claim 7 in which the water is present at greater than about 5 parts per hundred polyol.

18. The composition of claim 11 in which the water is present at greater than about 5 parts per hundred polyol.

19. The method of claim 12 in which the water is present at greater than about 5 parts per hundred polyol.

20. The method of claim 13 in which the water is present at greater than about 5 parts per hundred polyol.

* * * * *